(12) United States Patent
Ono et al.

(10) Patent No.: US 8,387,907 B2
(45) Date of Patent: Mar. 5, 2013

(54) SEATBELT DEVICE

(75) Inventors: Katsuyasu Ono, Yokohama (JP); Yuichi Hamano, Yokohama (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/257,099

(22) PCT Filed: Mar. 17, 2010

(86) PCT No.: PCT/JP2010/054605
§ 371 (c)(1),
(2), (4) Date: Sep. 16, 2011

(87) PCT Pub. No.: WO2010/107075
PCT Pub. Date: Sep. 23, 2010

(65) Prior Publication Data
US 2012/0006928 A1    Jan. 12, 2012

(30) Foreign Application Priority Data

Mar. 18, 2009    (JP) ................................. 2009-065685

(51) Int. Cl.
*B65H 75/48*    (2006.01)
(52) U.S. Cl. ..................................... 242/379; 242/379.1
(58) Field of Classification Search .................. 242/374, 242/379, 379.1; 280/805; 297/471, 472
See application file for complete search history.

(56) References Cited

U.S. PATENT DOCUMENTS

| | | | |
|---|---|---|---|
| 6,105,894 A * | 8/2000 | Singer et al. | 242/379.1 |
| 6,416,008 B1 * | 7/2002 | Fujii et al. | 242/379.1 |
| 6,986,480 B2 * | 1/2006 | Blum et al. | 242/379.1 |
| 7,946,519 B2 * | 5/2011 | Gray | 242/374 |
| 2007/0120002 A1 * | 5/2007 | Hori | 242/379.1 |
| 2008/0029633 A1 * | 2/2008 | Hiramatsu | 242/379.1 |
| 2011/0031340 A1 * | 2/2011 | Maekubo et al. | 242/379.1 |

FOREIGN PATENT DOCUMENTS

| | | |
|---|---|---|
| JP | 11-139248 | 5/1999 |
| JP | 2001-106025 | 4/2001 |
| JP | 2007-69686 | 3/2007 |

OTHER PUBLICATIONS

English Translation of International Search Report of PCT/JP2010/054605, Mailed Apr. 13, 2010, 2 pages.
Microfilm of the specification and drawings annexed to the request of Japanese Utility Model Application No. 127605/1988 (Laid-open No. 48463/1990) (English Translation Not Available).
Microfilm of the specification and drawings annexed to the request of Japanese Utility Model Application No. 169687/1988 (Laid-open No. 90174/1990) (English Translation Not Available).

* cited by examiner

*Primary Examiner* — Sang Kim
(74) *Attorney, Agent, or Firm* — Brinks Hofer Gilson & Lione (57) ABSTRACT

A seat belt device is provided with a pin for connecting a spindle and a tread head in an initial state. The breaking load of the pin is varied depending on the direction of relative rotation between the tread head and the spindle, such that the pin breaks at a smaller load during operation of a pretensioner. As a result, this allows firmly fixing together the spindle and the lock member during ordinary use without adversely affecting usability, and, upon vehicle collision or the like, the EA load is not affected through breaking of the pin at the smaller load.

16 Claims, 8 Drawing Sheets

SEATBELT DEVICE

BACKGROUND

1. Field of the Invention

The present invention relates to a seat belt device, and more particularly, to a seat belt device provided with an energy absorption mechanism that eases the load that an occupant receives from a webbing during a vehicle collision.

2. Related Technology

Seat belt devices for holding the occupant of a vehicle in his/her seat are provided with a emergency lock mechanism that is driven by a sensor that reacts to sudden acceleration, shocks or deceleration, so that, as a result, the emergency lock mechanism physically locks the drawing out of the webbing. The occupant can be thus effectively and safely restrained.

In order to enhance occupant protection, the latest seat belt devices are provided with a pretensioner for removing webbing slack during an emergency, such as a vehicle collision. As a result, the occupant is reliably held fast before moving frontward. An explosive is ordinarily used for actuating the pretensioner. The gas released upon blowup of the explosive causes the webbing to be quickly drawn in. A energy absorption mechanism is provided that absorbs energy and reduces the load on the chest of the occupant, while allowing for a predetermined extent of webbing draw-out, when the collision force in a vehicle collision is substantial and the load acting on the webbing on account of the inertial movement of the occupant becomes equal to or higher than a predetermined value established beforehand.

Ordinarily, torsion bars are widely employed as an energy absorption mechanism in such seat belt devices. A torsion bar is disposed coaxially with a spindle that takes the webbing up, such that one end of the torsion bar is fixed to the spindle, and the other end is fixed to a lock member (a component also referred to as tread head) of the emergency lock mechanism. When the load acting on the spindle in a webbing draw-out direction becomes equal to or higher than predetermined value during operation of the emergency lock mechanism, the torsion bar undergoes torsional deformation, and absorbs thereby collision energy (see, for instance, Japanese Patent Application Laid-open No. 2007-69686).

The spindle and the lock member of the emergency lock mechanism must be connected so as to rotate integrally with each other at an initial state. That is because if the above two members are not connected so as to rotate integrally, usability becomes impaired upon ordinary take-up or draw-out of the webbing, and noise and backlash occur as a result. For instance, pins are ordinarily used as a connecting means in such cases.

Coupling between the spindle and the lock member by way of pins is advantageous in that even in a strong connection, once the pins are sheared, the pin-related load is not compounded with the energy absorption load of the torsion bar (hereafter, EA load). However, the load may rise instantaneously during shearing, and the breaking load may become compounded with the EA load at that time.

Conventionally, the breaking load of the pins has been smaller than the EA load, even if the breaking load of the pin is compounded with the EA load, and hence no particular problems occurred. In recent years, however, the EA load has decreased in order to improve the collision absorption performance of vehicle bodies, and to improve the performance of occupant restraining techniques. Accordingly, the breaking load of the pins may now be greater than the EA load in some cases.

SUMMARY

In the light of the above problems, it is an object of the present invention to provide a seat belt device that allows firmly fixing together a spindle and a lock member during ordinary use, without adversely affecting usability, and, upon vehicle collision or the like, without affecting EA load, through pin breaking at a small load.

The abovementioned object of the present invention is attained by virtue of a seat belt device, having a retractor frame;

a spindle that is rotatably attached to the retractor frame and that has a webbing wrapped around an outer periphery thereof;

a lock member that is rotatable with respect to the retractor frame and that can be locked during an emergency;

a pin that connects the spindle and the lock member such that the spindle and the lock member rotate integrally with each other in an initial state, and that is broken, when a predetermined relative rotational force acts between the spindle and the lock member, to separate thereby the spindle from the lock member in a state where the spindle and the lock member can rotate relatively to each other;

emergency lock means for, during the emergency, locking the lock member to the retractor frame, thereby hindering rotation of the spindle in a webbing draw-out direction;

a pretensioner that causes the spindle to rotate in a take-up direction in order to take up a predetermined length of the webbing before the emergency lock means operates, during the emergency;

an energy absorption mechanism whose one end is fixed to the spindle and the other end is fixed to the lock member, and which absorbs collision energy while allowing relative rotation between the spindle and the lock member, when, during the emergency, a rotational force equal to or greater than a predetermined value acts, in the webbing draw-out direction, on the spindle, in a state where the lock member is locked by the emergency lock means;

wherein a breaking load of the pin is set to be varied depending on the direction of relative rotation between the lock member and the spindle, the setting being implemented such that a breaking load at a time when the spindle is about to rotate relative to the lock member in the webbing draw-out direction is greater than a breaking load at a time when the spindle would rotate relative to the lock member in a webbing take-up direction.

In another aspect of the seat belt device according to the invention, a pin projects integrally from one of the spindle and the lock member, such that the pin fits into a hole formed in the other one of the spindle and the lock member, as a result of which the spindle and the lock member are connected, by way of the pin, so as to rotate integrally with each other in an initial state.

In a further aspect of the seat belt device according to the invention, the spindle and the pin are formed integrally in the form of a die-casting of an aluminum alloy material.

In yet another aspect of the seat belt device according to the invention, the pin is formed separately from the spindle and the lock member, such that the pin fits into respective holes formed in the spindle and the lock member, as a result of which the spindle and the lock member are connected, by way of the pin, so as to rotate integrally with each other in an initial state.

In yet a further aspect of the seat belt device according to the invention, the pin is formed of any material from among a high-strength resin, a light alloy and steel.

In still another aspect of the seat belt device according to the invention, a notch, for making the breaking load of the pin vary depending on the direction of relative rotation of the lock member and the spindle, is provided at part of the periphery of a base section of the pin, the notch being set such that a position at a base end of the pin on the opposite side to the deep notch becomes a breaking reference point at a time when the spindle is about to rotate with respect to the lock member in the webbing draw-out direction, and such that a position at the base end of the pin corresponding to a position at the bottom of the deep notch becomes a breaking reference point at a time when the spindle is about to rotate with respect to the lock member in the webbing take-up direction.

In still a further aspect of the seat belt device according to the invention, a notch, for making the breaking load of the pin vary depending on the direction of relative rotation of the lock member and the spindle, is provided at part of the periphery of a base section of the pin; and a distance from a point of action at which there acts a pushing pressure for breaking the pin up to the breaking reference point at a time when the spindle is about to rotate with respect to the lock member in the webbing take-up direction is longer than a distance from a point of action at which there acts a pushing pressure for breaking the pin up to the breaking reference point at a time when the spindle is about to rotate with respect to the lock member in the webbing draw-out direction.

In another aspect, the seat belt device according to the invention includes a collision energy-absorbing cushion section for eliciting a varied breaking load depending on the direction of relative rotation of the lock member and the spindle is provided at part of the circumferential direction of the pin, the cushion section being set such that when a load equal to or greater than a predetermined load acts on the pin as a result of relative rotation of the spindle with respect to the lock member in the webbing draw-out direction, collision energy is absorbed in part through crushing of the cushion section, and such that, when a load equal to or greater than a predetermined load acts on the pin as a result of relative rotation of the spindle with respect to the lock member in the webbing take-up direction, the pin absorbs that load and breaks on a side at which the cushion section is absent.

In the seat belt device of the present invention, the breaking load of a pin is different depending on the direction of relative rotation of a lock member and a spindle. Ordinarily, the lock member is brought to an operation-locked state, through the action of webbing draw-out acceleration detection means (WSI), when the spindle is suddenly accelerated in the draw-out direction. During take up, by contrast, the spindle is not locked at any time. Among the loads acting on the pins, the largest static load stress acts when the lock member is a locked state, during draw-out. By contrast, the largest collision force acts during the operation of the pretensioner, upon take up.

In the present invention, the breaking load of the pin is set so as to be greater when the spindle would rotate relative to the lock member in the webbing draw-out direction than when the spindle would rotate relative to the lock member in the webbing take-up direction. As a result, the pin can break at a relatively small load, during operation of the pretensioner, in such a manner that EA load is not affected.

The pin does not break under a rotational load in the draw-out direction during ordinary use, for instance a draw-out operation by an occupant, or under a rotational load in the draw-out direction upon sudden braking to a degree that does not trigger operation of the pretensioner. When the pretensioner operates during an emergency, the spindle rotates rapidly in the webbing take-up direction. The driving force of the pretensioner is very large, and an impact-like large load is generated, as a result of which the pin, which exhibits a relatively small breaking load in that direction, breaks during the above operation, and the connection between the spindle and the lock member by way of the pin is removed. The spindle and the lock member are connected by way of the torsion bar, but the pin breaks in practice on account of the rattle (clearance and the like) that exists to some degree at the connection portions, and on account of deformation proportional to the angle of torsion of the torsion bar in the elastic range.

After take-up by the pretensioner, the seat belt starts being drawn out on account of the acceleration, towards the vehicle front, that acts on the passenger. Simultaneously therewith, the emergency lock means operates to lock the lock member. The load for breaking the pin constitutes no resistance when the energy absorption mechanism absorbs collision energy as a result of a rotational force equal to or greater than a predetermined rotational force that acts on the spindle, in the webbing draw-out direction. As a result, the energy absorption performance during emergencies can be optimized without impairing usability during ordinary use, even if a low EA load (energy absorption load) is set.

Herein, the pin projects integrally from one of either the spindle and the lock member, such that the pin fits into a hole formed in the other of the spindle and the lock member, as a result of which the spindle and the lock member can be connected together. In this case, the spindle and the pin are preferably formed as a die-casting of an aluminum alloy material, since the seat belt device can be made lighter thereby.

The pin may be formed separately from the spindle and the lock member, such that the pin fits into respective holes formed in the spindle and the lock member, and the spindle and the lock member can be connected as a result. In this case, the pin can be formed out of any material from among a high-strength resin, a light alloy and steel.

Means for eliciting a varied breaking load in the pin depending on the direction of relative rotation of the lock member and the spindle may involve, for instance, providing a notch at part of the periphery of a base section of the pin that projects from either the spindle or the lock member. The same effect can be afforded by providing a collision energy-absorbing cushion section at part of the circumferential direction of the pin.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIG. 4 illustrates a cross section of a connecting portion by a pin, along the rotation direction of a spindle, wherein FIG. 4(a) is a cross-sectional diagram illustrating a notch being formed at a base end of the pin, and FIG. 4(b) is a cross-sectional diagram illustrating the effect of the rotation direction of the spindle on the breaking load of the pin;

FIG. 6 illustrates a connecting portion of a pin in a case where a pin is formed separately from a spindle and a tread head, in a seat belt device of a second embodiment, wherein FIG. 6(a) is a cross-sectional diagram of a cross section along the same direction as in FIG. 4, FIG. 6(b) is a cross-sectional diagram generally viewed along line Vb-Vb in FIG. 6(a), and FIG. 6(c) is a cross-sectional diagram illustrating a crushed state of projections, as a cushion section, as a result of a load in the direction of arrow B of FIG. 6(a) and FIG. 6(b);

FIG. 7 illustrates a procedure in which a spindle and a tread head are connected by way of the pin of FIG. 6, wherein FIG. 7(a) is a cross-sectional diagram illustrating a state where a hole into which a pin fits is formed at an end face of the spindle, FIG. 7(b) is a cross-sectional diagram illustrating a state in which the hole matches a hole in the tread head, FIG. 7(c) is a cross-sectional diagram illustrating a crimped state of a head portion resulting from fitting of the pin into the hole of the tread head and the hole of the spindle, and FIG. 7(d) is a cross-sectional diagram viewed from arrow Vld-Vld in FIG. 7(c) illustrating the configuration of a rotation-preventing portion of the pin; and FIG. 8 is a set of illustrations showing an instance where a pin is formed separately from a spindle and a tread head in a seat belt device of a third embodiment, wherein FIG. 8(a) is a cross-sectional diagram illustrating the configuration of a spindle side, and FIG. 8(b) is a cross-sectional diagram illustrating a crimped state of a head portion resulting from fitting of the pin into the hole of the tread head and the hole of the spindle.

DETAILED DESCRIPTION

Various embodiments of the seat belt device according to the present invention are explained below based on accompanying drawings.

Figure 1:
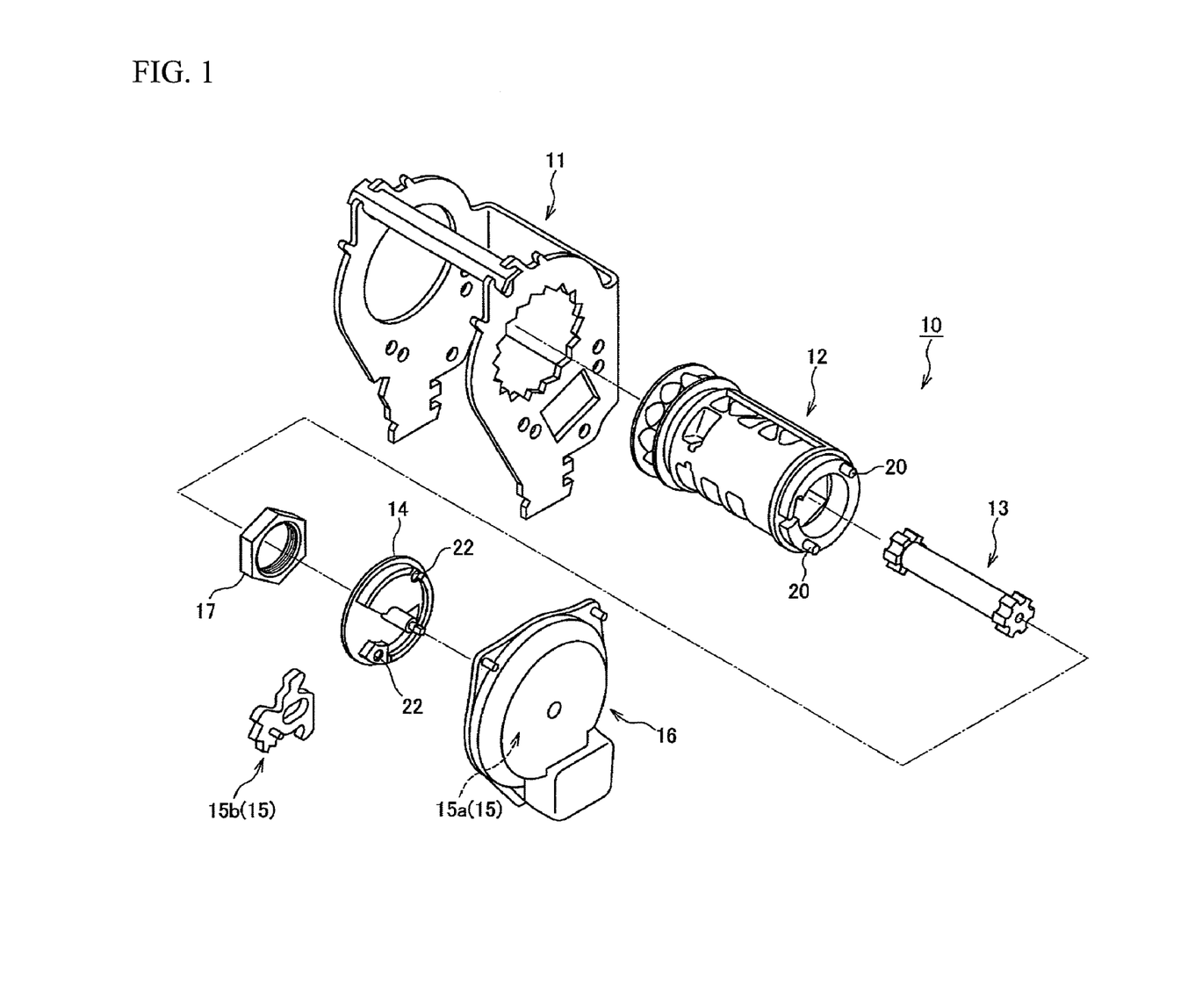
FIG. 1 is an exploded perspective-view illustrating a relevant portion of a seat belt device in a first embodiment of the present invention.
Figure 2:
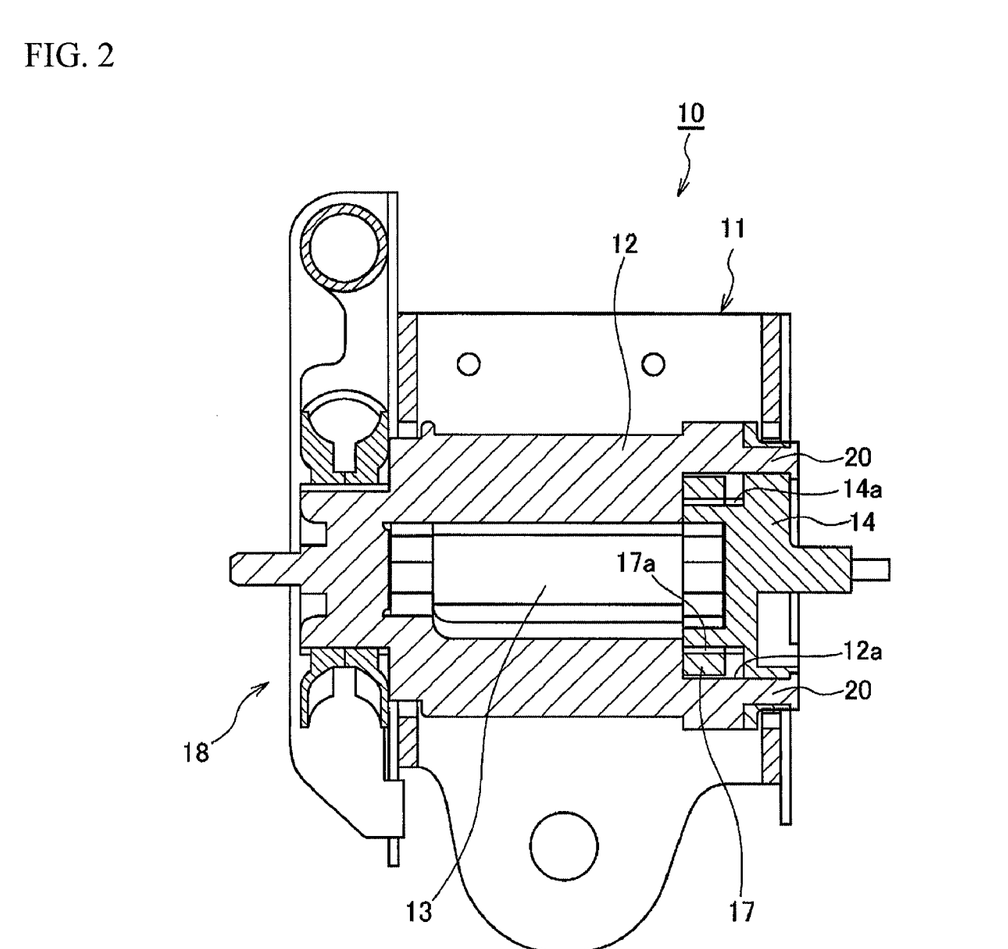
FIG. 2 is a cross-sectional view of the relevant portion of the seat belt device illustrated in FIG. 1.
Figure 4:
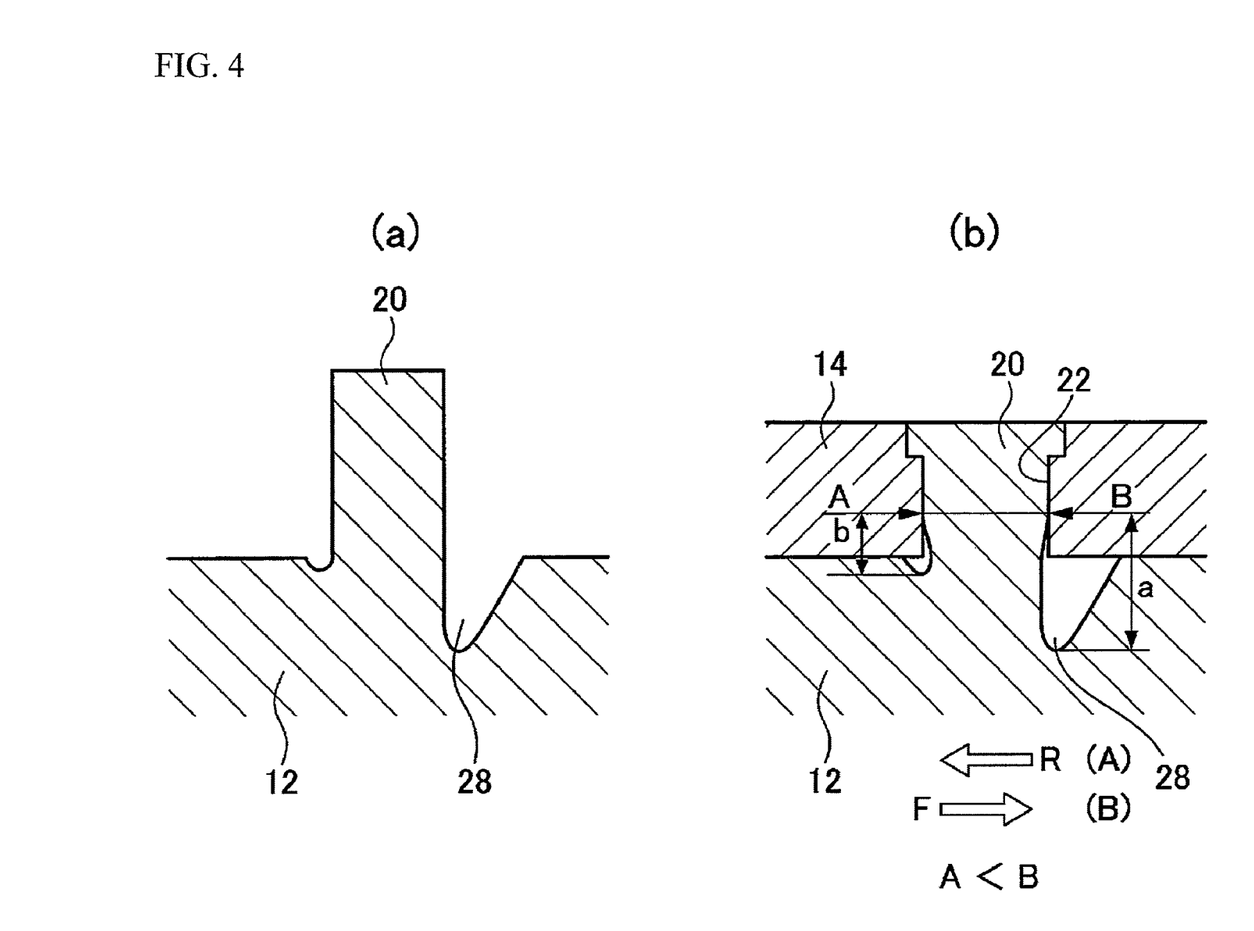
Figure 5:
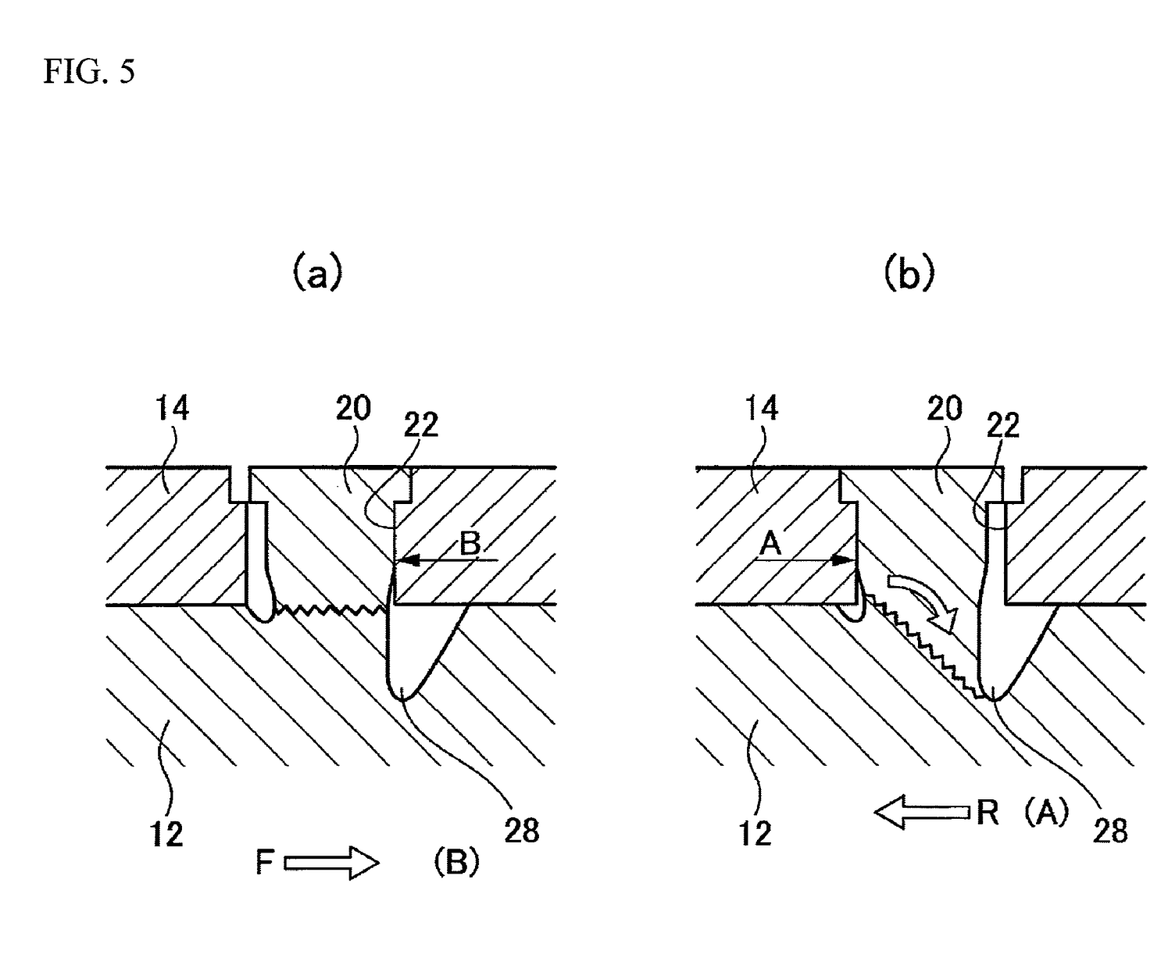
FIG. 5(a) is a diagram for explaining pin breakage when a spindle would rotate in a webbing draw-out direction.
FIG. 5(b) is a diagram for explaining pin breakage when the spindle would rotate in a webbing take-up direction.

As illustrated in FIG. 1 and FIG. 2, a seat belt device 10 according to a first embodiment of the invention comprises: a retractor frame 11 attached to a vehicle body (not shown); a substantially tubular spindle 12, rotatably attached to the retractor frame 11, and having webbing (not shown) wrapped around the outer periphery; a tread head 14, rotatable with respect to the retractor frame 11, as a lock member that can be locked during an emergency; pins 20 that connect the spindle 12 and the tread head 14 in such a manner that the spindle 12 and the tread head 14 rotate integrally with each other in an initial state, wherein the pins 20 break when a predetermined relative rotational force acts between the spindle 12 and the tread head 14, to separate thereby the spindle 12 and the tread head 14 in a state where the spindle 12 and the tread head 14 can rotate relative to each other; and emergency lock means 15 that locks the tread head 14 to the retractor frame 11 during an emergency, to hinder thereby rotation of the spindle 12 in a webbing draw-out direction (direction of arrow F in FIG. 4 and FIG. 5).

The seat belt device 10 comprises a pretensioner 18 that causes the spindle 12 to rotate rapidly in a take-up direction (direction of arrow R in FIG. 4 and FIG. 5), in order to take up a predetermined length of the webbing before the emergency lock means 15 operates during the emergency; and a torsion bar 13 built into the spindle 12 and that extends along the axis center of the spindle 12, such that one end of the torsion bar 13 in the axial direction is integrally fixed to the spindle 12, and the other end in the axial direction is fixed to the tread head 14. The torsion bar 13 acts as a energy absorption mechanism that, through torsional deformation, absorbs collision energy while allowing relative rotation between the spindle 12 and the tread head 14, when, during the emergency, a rotational force equal to or greater than a predetermined value acts on the spindle 12 in the webbing draw-out direction (direction of arrow F in FIG. 4 and FIG. 5), in a state where the tread head 14 is locked by the emergency lock means 15.

Also provided are, for instance, a take-up spring device, not shown, within a cover 16 that normally urges the spindle 12 in the webbing take-up direction.

A sensor 15a for detecting a vehicle emergency, in the form of, for instance, vehicle acceleration detection means or webbing draw-out acceleration detection means, is disposed in the emergency lock means 15, within the cover 16. Through the action of the sensor 15a, a pawl 15b becomes engaged to the retractor frame 11, and the tread head 14 becomes locked to the retractor frame 11 as a result.

A hexagonal hole 12a is disposed at an end portion of the spindle 12, on the side of the tread head 14. A hexagonal nut 17 is accommodated in the hexagonal hole 12a, in a state where the hexagonal nut 17 can rotate integrally with the spindle 12 and can slide with respect to the spindle 12 in the axial direction. A male thread section 14a of the tread head 14 is screwed onto the hexagonal nut 17, such that, during rotation of the hexagonal nut 17 in response to rotation of the spindle 12, the hexagonal nut 17 shifts in the axial direction as a result of the lead action of a female thread section 17a that is screwed onto the male thread section 14a of the tread head 14. The rotation of the spindle 12 with respect to the tread head 14 is restricted to go no further than upon abutment of the hexagonal nut 17 against an inner stopper wall of the spindle 12.

Figure 3:
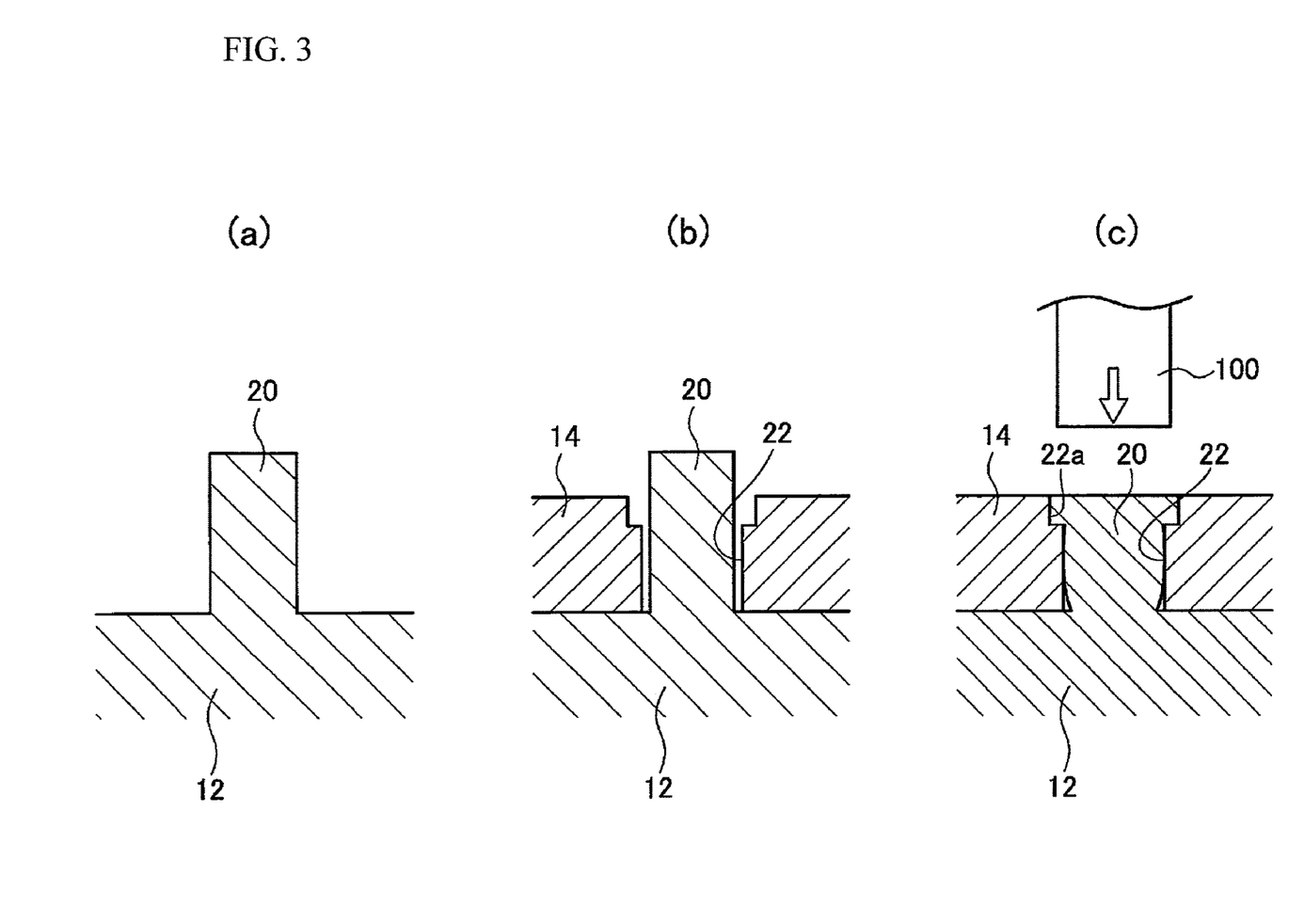
FIG. 3 illustrates a procedure for connecting a tread head and a spindle in a seat belt device, by way of a pin that is integral with the spindle, wherein FIG. 3(*a*) is a cross-sectional diagram illustrating a state in which a pin projects out of an end face of the spindle, FIG. 3(*b*) is a cross-sectional diagram illustrating a state in which the pin is fitted into a hole of the tread head, and FIG. 3(*c*) is a cross-sectional diagram illustrating a state in which the head of the pin is deformed or crimped to connect thereby the spindle to the tread head.

The pins 20 that connect the spindle 12 and the tread head 14 are provided as a plurality thereof spaced apart from each other in the circumferential direction of the spindle 12 (as two pins spaced apart from each other by 180° in the example of the figures). As illustrated in FIG. 3, the pins 20 protrude unitarily out of an end face of the spindle 12 that is formed as a die-casting of a light alloy material, such as an aluminum alloy or the like, such that the pins 20 fit into holes 22 formed in the tread head 14. As a result, the spindle 12 and the tread head 14 are connected, by way of the pins 20, so as to rotate integrally with each other in an initial state. In this case, the pins 20 protruding as in FIG. 3(a) are inserted through the holes 22 of the tread head 14, as illustrated in 3(b). Thereafter, the head portions of the pins are driven in using a hammer 100, or other implement, as illustrated in FIG. 3(c), whereby the pins become deformed or crimped onto opening shoulders 22a of the holes 22 of the tread head 14.

An important feature herein is that the breaking load of the pins 20 is varied depending on the direction of relative rotation of the tread head 14 and the spindle 12. Herein, the pins 20 are configured so as to exhibit a large breaking load when the spindle 12 would rotate relative to the tread head 14 in the webbing draw-out direction, and to exhibit a small breaking load when the spindle 12 would rotate relative to the tread head 14 in the webbing take-up direction.

Specifically, a notch 28 for making the breaking load of the pins 20 vary, depending on the direction of relative rotation of the tread head 14 and the spindle 12, is provided at part or all of the periphery of a base section of each pin 20, as illustrated in FIG. 4(*a*) and FIG. 4(*b*).

The following operation differences according to the rotation direction of the spindle 12 arise depending on the depth of the notch and/or its presence or absence of the notch 28. A position of the base end of the pins 20, on a side of a shallow notch, or a shallow side of the notch, opposite a deep notch 28, or a deep side of the notch, constitutes a breaking reference point at a time when the spindle 12 would rotate with respect to the tread head 14 in the webbing draw-out direction (direction of arrow F). A position of the base end of the pins 20 corresponding to the position of the bottom of the deep notch 28 constitutes a breaking reference point at a time when the spindle 12 would rotate with respect to the tread head 14 in the webbing take-up direction (direction of arrow R). Herein, "breaking reference point" denotes a site, in the main body of the spindle 12, that can be regarded as the portion of the main body of the spindle 12 that receives the forces acting on the pins 20 from the tread head 14, i.e. that can be regarded as a fulcrum of the moment of the forces acting on the pins 20.

Taking a and b as the distances from the lowermost point (point of action, in the present invention) of the portion acted upon by the pushing pressure for breaking the pins 20 (herein, a>b), then a pushing pressure denoted by arrow B in FIG. 4(*b*) acts on a point at the closer distance b from the reference point when the spindle 12 would rotate in the webbing draw-out direction (direction of arrow F). Mainly as a result of a shearing force, the pins 20 break substantially simultaneously starting from an origin point at the bottom of the contact surface with the tread head 14, as illustrated in FIG. 5(*a*). When the spindle 12 would rotate in the webbing take-up direction (direction of arrow R), a pushing pressure denoted by arrow A in FIG. 4(*b*) acts at a site removed by the farther distance a from the reference point. As a result, as illustrated in FIG. 5(*b*) the pins 20 are acted upon by flexural stress, and undergo flexural breaking towards the deep notch 28, from an origin at a position of the base end of the pins 20, on the side of the shallow notch. Herein, the shear breaking load (shear stress) B is greater than the flexural breaking load (flexural stress) A (B>A), and hence there is realized the above-mentioned difference of breaking load depending on the rotation direction of the spindle 12.

The operation of the embodiment is explained next.

Upon detection (prediction), by way of some means, of a vehicle collision, the pretensioner 18 operates first, causing the spindle 12 to rotate rapidly in the webbing take-up direction (direction of arrow R), and the slack of the webbing to be removed. At this time, the driving force of the pretensioner 18 is comparatively large, and hence the pins 20 that exhibit a small breaking load during rotation in that direction break at that point in time, and the spindle 12 separates from the tread head 14.

Next, the emergency lock means 15 operates and the tread head 14 is locked. When, in this state, a rotational force equal to or greater than a predetermined value acts on the spindle 12 in the webbing draw-out direction (direction of arrow F), causing the torsion bar 13 to twist and absorb collision energy. Since the pins 20 are already broken by the initial stage at which the torsion bar 13 starts twisting the load for breaking the pins 20 constitutes no resistance. As a result, the energy absorption performance during emergencies can be optimized without impairing usability during ordinary use, even if a low EA load (energy absorption load) is set.

In the seat belt device of the present embodiment, thus, the breaking load of the pins 20 is varied depending on the direction of relative rotation of the tread head 14 and the spindle 12. Ordinarily, the tread head 14 is brought to an operation-locked state, through the action of a WSI, when the spindle 12 is suddenly accelerated in the draw-out direction. During take up, by contrast, the spindle 12 is not locked at any time. Among the loads acting on the pins 20, the largest static load stress acts when the tread head 14 is a locked state, during draw-out. By contrast, the largest collision force acts during the operation of the pretensioner, upon take up.

In the present embodiment, the breaking load of the pins 20 is set so as to be greater when the spindle 12 would rotate relative to the tread head 14 in the webbing draw-out direction (direction of arrow F) than when the spindle 12 would rotate relative to the tread head 14 in the webbing take-up direction (direction of arrow R). As a result, the pins 20 can break at a relatively small load, during operation of the pretensioner, in such a manner that EA load is not affected.

The pins 20 are of sufficient strength so as to not break under a rotational load in the draw-out direction during ordinary use, for instance a draw-out operation by an occupant, or under a rotational load in the draw-out direction upon sudden braking to a degree that does not trigger operation of the pretensioner 18. When the pretensioner 18 operates during an emergency, the spindle 12 rotates rapidly in the webbing take-up direction. The driving force of the pretensioner 18 is very large, and an impact-like large load is generated, as a result of which the pins 20 that exhibit a relatively small breaking load in that direction break during the above operation, and the connection between the spindle 12 and the tread head 14 by way of the pins 20 is removed. The spindle 12 and the tread head 14 are connected by way of the torsion bar 13, but the pins 20 break in practice on account of the rattle (clearance and the like) that exists to some degree at the connection portion, and on account of deformation proportional to the angle of torsion of the torsion bar 13 in the elastic range.

After take-up by the pretensioner 18, the seat belt starts being drawn out on account of the acceleration, towards the vehicle front, that acts on the occupant. Simultaneously therewith, the emergency lock means operates to lock the tread head 14. The load for breaking the pins 20 constitutes no resistance when the energy absorption mechanism absorbs collision energy as a result of a rotational force equal to or greater than a predetermined rotational force that acts on the spindle 12, in the webbing draw-out direction. As a result, the energy absorption performance during emergencies can be optimized without impairing usability during ordinary use, even if a low EA load (energy absorption load) is set.

In the above-described embodiment, an instance has been explained in which the pins 20 are integrally provided on the spindle 12 side, but the pins 20 may be provided integrally on the tread head 14 side, or holes into which the pins 20 fit may be provided on the spindle 12 side, so that the pins 20 are fitted into the holes, to connect thereby the spindle 12 and the tread head 14.

Figure 6:
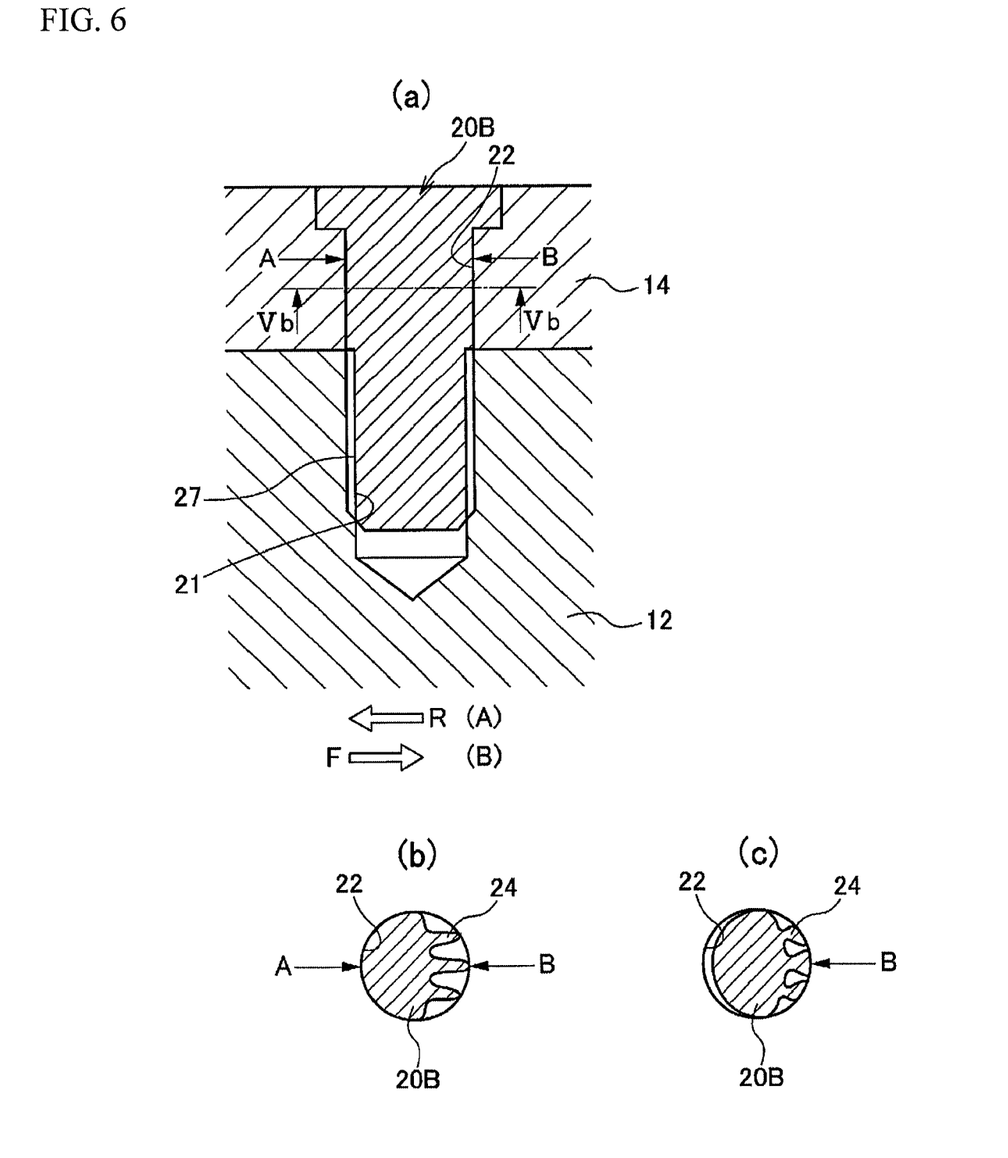
Figure 7:
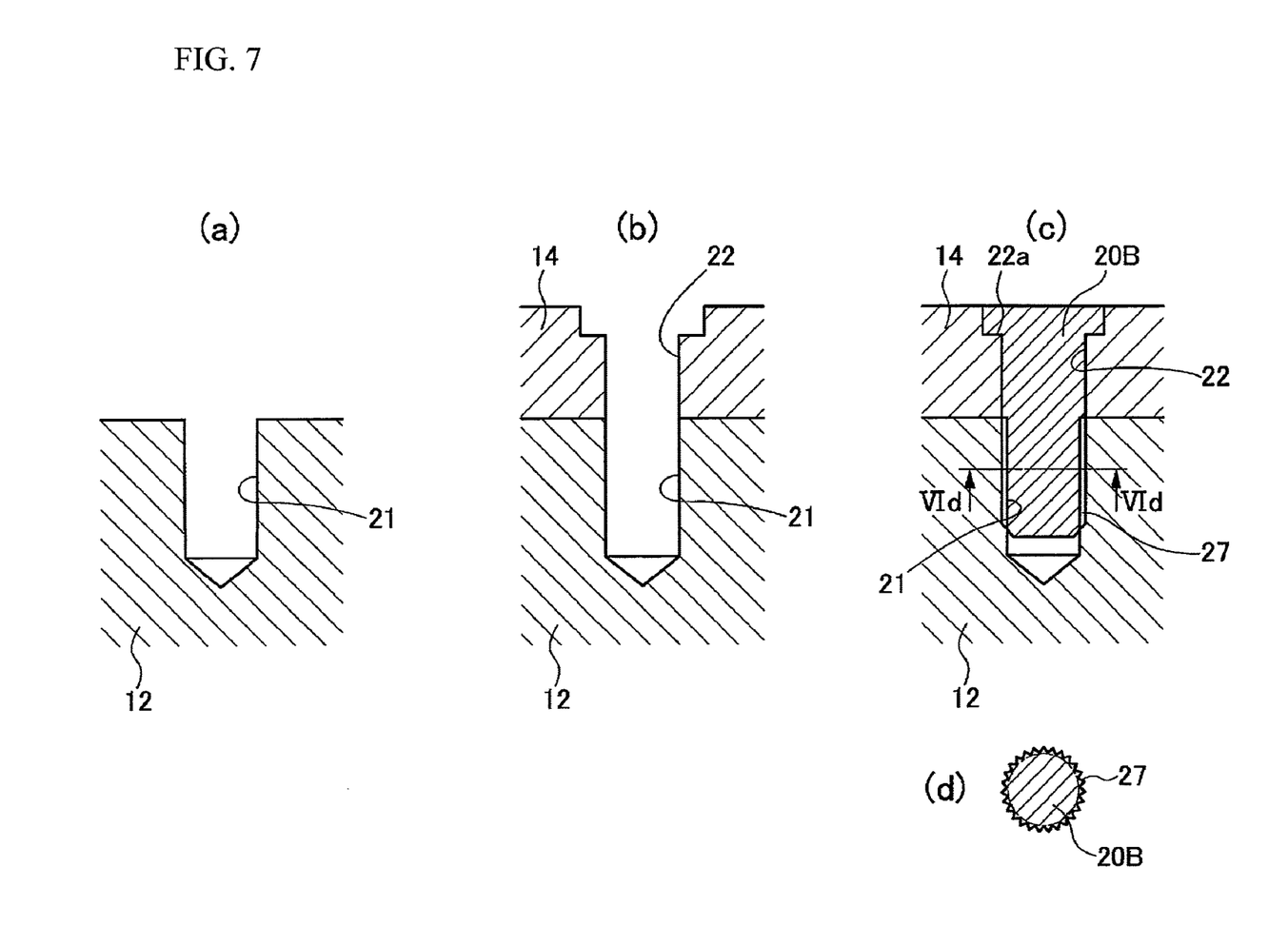

FIG. 6(*a*) to FIG. 7(*d*) illustrate structures of a connecting portion of pins 20B according to a seat belt device of a second embodiment of the present invention. The pins 20B are formed separately from the spindle 12 and the tread head 14. The spindle 12 and the tread head 14 are connected through fitting the pins 20B in holes 21, 22 respectively formed in the spindle 12 and the tread head 14. In a case where the pins 20B are formed separately from the spindle 12 and so forth, the foregoing can be formed out of any material from among a high-strength resin, a light alloy and steel.

In this case, part of the pins 20B, in the circumferential direction thereof, is provided with collision energy-absorbing crush projections (cushion sections) 24 for eliciting a varied breaking load depending on the direction of relative rotation of the tread head 14 and the spindle 12. When a load equal to or greater than a predetermined load acts on such pins 20B as a result of relative rotation of the spindle 12 with respect to the tread head 14 in the webbing draw-out direction (direction of arrow F), the crush projections 24 become crushed as illustrated in FIG. 6(c), absorbing thereby part of the collision energy. When a load equal to or greater than a predetermined load acts on the pins 20B as a result of relative rotation of the spindle 12 with respect to the tread head 14 in the webbing take-up direction (direction of arrow R), the pins 20B receive that load on the side where the crush projections 24 are absent, and break on account of that small load.

An engaging knurled or uneven section 27 (FIG. 7(d)) for arresting rotation is provided on the outer periphery of the pins 20B at one end, in order to restrict directionality of the circumferential direction of the pins 20B.

In a case where the tread head 14 and the spindle 12 are connected by way of the pins 20B, as illustrated in FIG. 7(a) and FIG. 7(b) the positions of the hole 21 on the spindle 12 side and of the hole 22 on the tread head 14 side are matched, and, in that state, the pins 20Bs are press-fitted into the holes 22, 21. The heads of the pins 20B are crushed or the like to crimp thereby the head portions of the pins 20B onto the opening shoulders 22a of the holes 22 of the tread head 14. The tread head 14 and the spindle 12 can be connected as a result in a simple manner (FIG. 7(c)).

Figure 8:
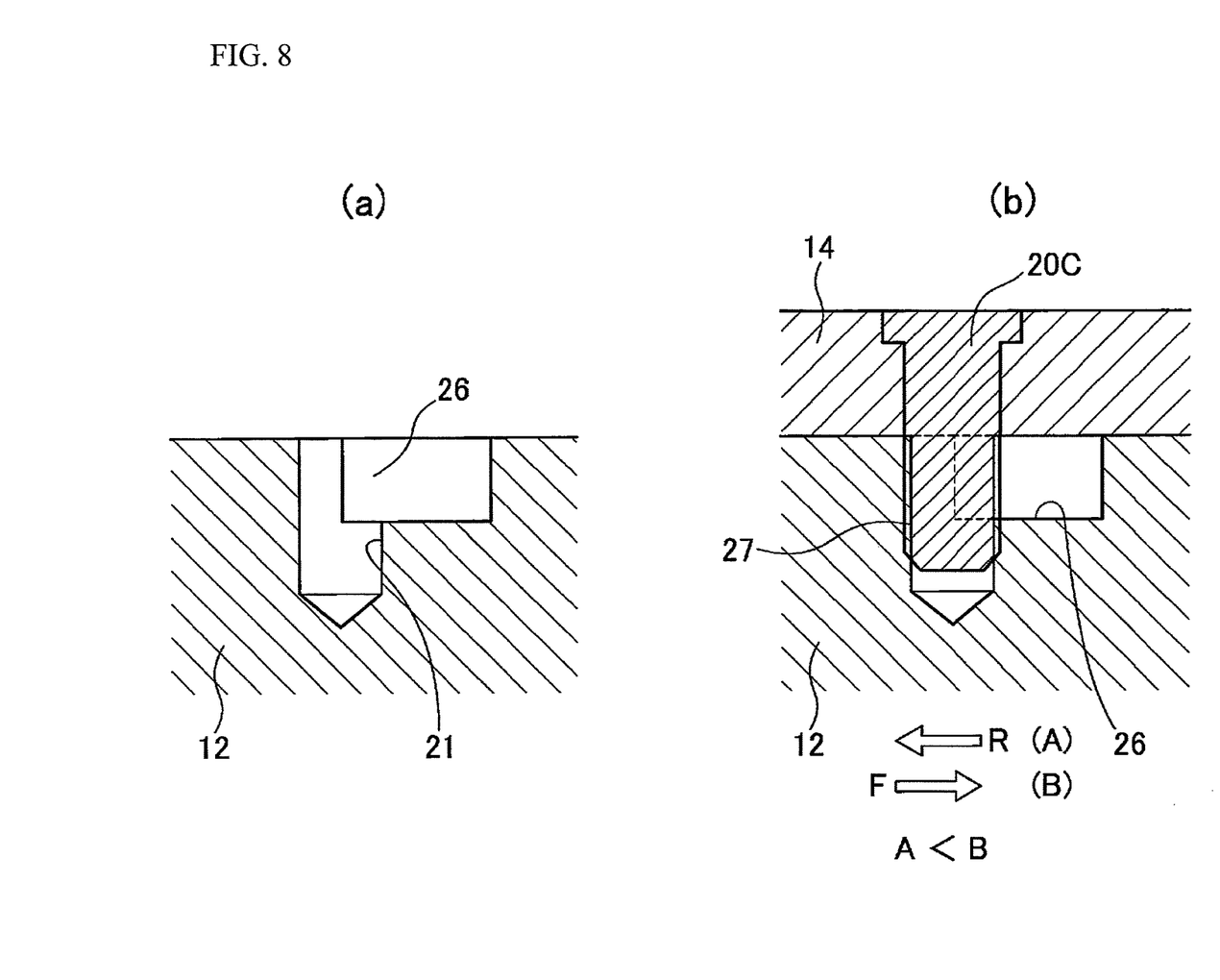

FIG. 8(a) and FIG. 8(b) illustrate structures of a connecting portion of pins 20C according to a seat belt device of a third embodiment of the present invention. The pins 20C are formed separately from the spindle 12 and the tread head 14. As in the second embodiment, an engaging uneven section 27 for arresting rotation is provided on the outer periphery at one end of the pins 20C. A notch 26 for making the breaking load of the pins 20C vary depending on the direction of relative rotation of the tread head 14 and the spindle 12 is provided, in the spindle 12, at part of the periphery of the base section of each pin 20C.

Therefore, as in the first embodiment, the pins 20C exhibit a larger breaking load when the spindle 12 would rotate relative to the tread head 14 in the webbing draw-out direction (direction of arrow F), and exhibit a smaller breaking load when the spindle 12 rotates relative to the tread head 14 in the webbing take-up direction (direction of arrow R). The pins 20C can break as a result at a smaller load, through the action of the pretensioner 18, during a vehicle collision, in such a manner that EA load is not affected.

The present invention is not limited to the above-described various embodiments, and may accommodate various modifications and improvements.

For instance, the notches 28, 26 are provided mainly in the spindle 12, but a notch may be provided in each pin 20 itself, through an appropriate calculation of the breaking load. That is, the "periphery of the base section of the pins 20" in the present invention encompasses not only the spindle portion around the vicinity of the root of the pins 20, but also the periphery of the pins 20 themselves, in that the thickness, diameter and so forth of the pins 20 themselves varies halfway along the longitudinal direction of the pins 20. If provided in the periphery of the base section of the pins 20, the notches may be provided in the spindle alone, or in the pins alone, or in both.

As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

The invention claimed is:

1. A seat belt device, comprising:
   a retractor frame;
   a spindle that is rotatably attached to the retractor frame and configured to have a webbing wrapped around an outer periphery thereof;
   a lock member that is rotatable with respect to the retractor frame and configured to be locked thereby preventing rotation during an emergency;
   a pin connecting the spindle and the lock member such that the spindle and the lock member rotate integrally with each other in an initial state, the pin being breakable when a predetermined relative rotational force acts between the spindle and the lock member, to separate the spindle from the lock member in a second state where the spindle and the lock member can rotate relatively to each other;
   an emergency lock configured to lock during the emergency, locking the lock member to the retractor frame, thereby hindering rotation of the spindle in a webbing draw-out direction;
   a pretensioner configured to cause the spindle to rotate in a take-up direction in order to take up a predetermined length of the webbing before the emergency lock operates, during the emergency, to lock the lock member;
   an energy absorption mechanism having one end fixed to the spindle and another end fixed to the lock member, and which is configured to absorb collision energy while allowing relative rotation between the spindle and the lock member, when, during the emergency, a rotational force equal to or greater than a predetermined value acts, in the webbing draw-out direction, on the spindle, in a state where the lock member is locked by the emergency lock, wherein
   the pin having first and second breaking loads depending on the direction of relative rotation between the lock member and the spindle, the breaking load being greater when the spindle is about to rotate relative to the lock member in the webbing draw-out direction than the breaking load when the spindle is about to rotate relative to the lock member in a webbing take-up direction.

2. The seat belt device according to claim 1, wherein the pin projects unitarily from one of the spindle and the lock member, such that the pin fits into a hole formed in the other one of the spindle and the lock member, as a result of which the spindle and the lock member are connected, by way of the pin, so as to rotate integrally with each other in an initial state.

3. The seat belt device according to claim 2, wherein the spindle and the pin are formed unitarily in the form of a die-casting of an aluminum alloy material.

4. The seat belt device according to claim 1, wherein the pin is formed separately from the spindle and the lock member, such that the pin fits into a hole formed in the spindle and a hole formed in the lock member, as a result of which the spindle and the lock member are connected, by way of the pin, so as to rotate integrally with each other in the initial state.

5. The seat belt device according to claim 4, wherein the pin is formed from one of a high-strength resin, a light alloy and steel.

6. The seat belt device according to claim 1, wherein the first and second breaking loads of the pin are defined by a notch provided at part of the periphery of a base section of the pin;
   the notch being provided such that a position at a base end of the pin on an opposite side to a deep portion of the notch becomes a breaking reference point at a time when the spindle is about to rotate with respect to the lock member in the webbing draw-out direction, and such that a position at the base end of the pin corresponding to a position at the bottom of the deep portion of the notch becomes a breaking reference point at a time when the spindle is about to rotate with respect to the lock member in the webbing take-up direction.

7. The seat belt device according to claim 1, wherein
the first and second breaking loads of the pin are defined by a notch provided at part of the periphery of a base section of the pin; and
a distance from a point of action at which there acts a pushing pressure for breaking the pin up to a breaking reference point at a time when the spindle is about to rotate with respect to the lock member in the webbing take-up direction is longer than a distance from a point of action at which there acts a pushing pressure for breaking the pin up to a breaking reference point at a time when the spindle is about to rotate with respect to the lock member in the webbing draw-out direction.

8. The seat belt device according to claim 1, wherein
a collision energy-absorbing cushion section for eliciting a varied breaking load depending on the direction of relative rotation of the lock member and the spindle is provided over at least part of a circumferential perimeter of the pin,
the cushion section being set such that when a load equal to or greater than a predetermined load acts on the pin as a result of relative rotation of the spindle with respect to the lock member in the webbing draw-out direction, collision energy is absorbed in part through crushing of the cushion section, and such that, when a load equal to or greater than a predetermined load acts on the pin as a result of relative rotation of the spindle with respect to the lock member in the webbing take-up direction, the pin absorbs that load and breaks on a side at which the cushion section is absent.

9. The seat belt device according to claim 8, wherein the cushion section is defined by crushable portions of the pin.

10. The seat belt device according to claim 9, wherein the crushable sections are ribs formed on the pin.

11. The seat belt device according to claim 10, wherein the ribs extend longitudinally along the pin.

12. The seat belt device according to claim 11, wherein at least some of the ribs have different heights relative to others of the ribs.

13. The seat belt device according to claim 1, wherein the first and second breaking loads of the pin are defined by a notch, the notch having a shallow portion and a deep portion located on opposite sides of the pin.

14. The seat belt device according to claim 13, wherein the notch is formed in the spindle at a base portion of the pin.

15. The seat belt device according to claim 1, wherein the first and second breaking loads of the pin are defined by a notch formed in the spindle at a base portion of the pin.

16. The seat belt device according to claim 15, wherein the notch is defined on one side of the pin.

* * * * *